United States Patent
Lee

(10) Patent No.: US 6,666,789 B2
(45) Date of Patent: Dec. 23, 2003

(54) FRICTIONAL VARIABLE TRANSMISSION FOR VEHICLE

(75) Inventor: Yong-Hoon Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 09/987,474

(22) Filed: Nov. 14, 2001

(65) Prior Publication Data

US 2002/0058563 A1 May 16, 2002

(30) Foreign Application Priority Data

Nov. 15, 2000 (KR) ........................................ 2000-67725

(51) Int. Cl.$^7$ .............................................. F16H 15/14
(52) U.S. Cl. .............................. 476/36; 476/23; 476/54
(58) Field of Search .............................. 476/15, 18, 21, 476/23, 47, 48, 49, 50, 54, 61; 192/85 A, 85 C

(56) References Cited

U.S. PATENT DOCUMENTS

| | | | | |
|---|---|---|---|---|
| 1,002,477 A | * | 9/1911 | Weerts .......................... | 476/54 |
| 1,022,845 A | * | 4/1912 | Hipple .......................... | 476/21 |
| 1,129,629 A | * | 2/1915 | Berstler ........................ | 476/23 |
| 1,428,898 A | * | 9/1922 | Nagle ........................... | 74/721 |
| 1,517,552 A | * | 12/1924 | Fite ............................. | 476/21 |
| 1,700,981 A | * | 2/1929 | Hayes .......................... | 476/54 |
| 2,979,970 A | * | 4/1961 | Rouverol ....................... | 476/9 |
| 3,802,284 A | * | 4/1974 | Sharpe et al. .................. | 476/10 |

FOREIGN PATENT DOCUMENTS

| JP | 54-40374 A | | 3/1979 |
|---|---|---|---|
| JP | 5-345525 | * | 12/1993 |

* cited by examiner

Primary Examiner—William C Joyce
(74) Attorney, Agent, or Firm—Birch, Stewart, Kolasch & Birch, LLP

(57) ABSTRACT

A frictional variable transmission for a vehicle comprising a rotating unit rotated by an engine of the vehicle; a power-varying unit that varies, in a state of contacting the rotating unit, a rotational force transmitted from the rotating unit 21 by moving in a predetermined direction; a hydraulic clutch mounted off-center from the rotating unit, and varying between states of frictional contact with or separation from the power-varying unit by hydraulic pressure generated according to a depressed state of a clutch pedal, thereby controlling the transmission of rotational force of the power-varying unit; and a power transmitter linked to the movement of the hydraulic clutch, and transmitting a rotational force corresponding to an input state of rotational force transmitted through the rotating unit and the power-varying unit.

10 Claims, 5 Drawing Sheets

High speed rotation

Low speed rotation

Reverse rotation

FRICTIONAL VARIABLE TRANSMISSION FOR VEHICLE

BACKGROUND OF THE INVENTION (a) Field of the Invention

The present invention relates to a frictional variable transmission for a vehicle.

(b) Description of the Related Art

A transmission functions to deliver engine drive power to the drive wheels. Two basic types of transmissions are the manual transmission, in which the driver manipulates a shift lever to control shifting into different speeds and ranges, and the automatic transmission, in which shifting into the different forward speeds is automatically controlled according to various driving conditions. Another type of transmission is the gearless transmission, which automatically and continuously performs shifting over a single, large range of speeds when in drive and reverse.

FIG. 1 shows a sectional view of a pulley portion of a conventional gearless transmission.

A drive pulley 20 and a driven pulley 30, which are connected by a belt 10, are mounted respectively on a drive shaft 12 and a driven shaft 14. Shifting is realized typically by varying relative functional diameters of the pulleys 20 and 30. The drive pulley 20 includes a first fixed pulley 22 fixedly mounted on the drive shaft 12, and a first variable pulley 24 mounted on the drive shaft 12 and which undergoes rectilinear motion thereon such that the functional diameter of the drive pulley 20 is varied.

The basic structure of the driven pulley 30 is identical to the structure of the drive pulley 20. That is, the driven pulley 30 includes a second fixed pulley 32 and a second variable pulley 34, which operate similarly to the first fixed pulley 22 and the first variable pulley 24.

A shift range of the gearless transmission structured as in the above is determined by the scope of movement of the first variable pulley 24 of the drive pulley 20 and the second variable pulley of the driven pulley 30. A rotational force of an engine passes through a torque converter and the drive shaft 12, and is transmitted to a differential via a power transmission axle that is arranged in parallel with the driven shaft and according to a variations in functional diameter of the drive pulley 20 and the driven pulley 30.

However, the conventional gearless transmission described above has several drawbacks. These include a large number of parts, complicated structure, and significant weight.

SUMMARY OF THE INVENTION

The present invention has been made in an effort to solve the above problems.

It is an object of the present invention to provide a frictional variable transmission for a vehicle that is simple in structure and lightweight.

To achieve the above object, the present invention provides a frictional variable transmission comprising a rotating unit rotated by an engine of the vehicle; a power-varying unit that varies, in a state of contacting the rotating unit, a rotational force transmitted from the rotating unit by moving in a predetermined direction; a hydraulic clutch mounted off-center from the rotating unit, and varying between states of frictional contact with or separation from the power-varying unit by hydraulic pressure generated according to a depressed state of a clutch pedal, thereby controlling transmission of rotational force of the power-varying unit; and a power transmitter linked to the movement of the hydraulic clutch, and transmitting a rotational force corresponding to an input state of rotational force transmitted through the rotating unit and the power-varying unit.

According to a feature of the present invention, the friction generated by the contact of the power-varying unit with the rotating unit and the hydraulic clutch undergoes rolling contact in an elastohydrodynamic region, and an elastohydrodynamic fluid film is formed.

According to another feature of the present invention, if the power-varying unit is positioned at an outer circumference region of the rotating unit, the rotating unit rotates the power-varying unit at a high speed such that the power-varying unit rotates the hydraulic clutch faster than the rotating unit.

According to yet another feature of the present invention, if the power-varying unit is positioned at an inner circumference region of the rotating unit, the rotating unit rotates the power-varying unit at a low speed such that the power-varying unit rotates the hydraulic clutch slower than the rotating unit.

According to still yet another feature of the present invention, if the power-varying unit is positioned on one side of an imaginary center-line of the rotating unit, the rotating unit rotates the power-varying unit in a reverse direction such that the hydraulic clutch is rotated in a direction opposite that of the rotating unit.

According to still yet another feature of the present invention, a crankshaft, which rotates according to operation of the engine, interconnects the rotating unit and the engine, and a frictional face of the rotating unit that contacts the power-varying unit is evenly formed and acts as a frictional flywheel.

According to still yet another feature of the present invention, the crankshaft and the rotating unit are integrally formed.

According to still yet another feature of the present invention, the power-varying unit comprises a shift lever; a shift fork indexed with the shift lever; a shift rod positioned from a circumferential outer direction of the rotating unit to a circumferential inner direction of the rotating unit between the rotating unit and the hydraulic clutch, both ends of the shift rod being fixed; and a shift ball mounted on the shift rod, and which, in a state of being connected to the shift fork, receives rotational force of the rotating unit according to movement from the circumferential outer direction to the circumferential inner direction of the rotation power unit, thereby rotating in a predetermined direction.

According to still yet another feature of the present invention, the shift ball comprises a hole through which the shift rod passes for mounting of the shift ball on the shift rod; a fork-receiving portion linked to the movement of the shift lever and to which the shift fork is connected to enable movement in the axial direction of the shift rod; and a rolling frictional surface formed roughly hemispherically under the fork-receiving portion.

According to still yet another feature of the present invention, the hydraulic clutch comprises a clutch housing; a hydraulic pressure chamber formed in the clutch housing and which generates a predetermined hydraulic pressure according to a depressed state of the clutch pedal; and a friction plate mounted off-center from the rotating unit and connected to a clutch shaft, the clutch shaft moving in a direction of its longitudinal axis according to the generation of hydraulic pressure in the hydraulic pressure chamber such that the friction plate comes into contact with and is separated from the power-varying unit.

According to still yet another feature of the present invention, the clutch shaft and the friction plate are integrally formed.

According to still yet another feature of the present invention, if the clutch pedal is depressed, the hydraulic pressure formed in the hydraulic pressure chamber is exhausted such that the friction plate is separated from the power-varying unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
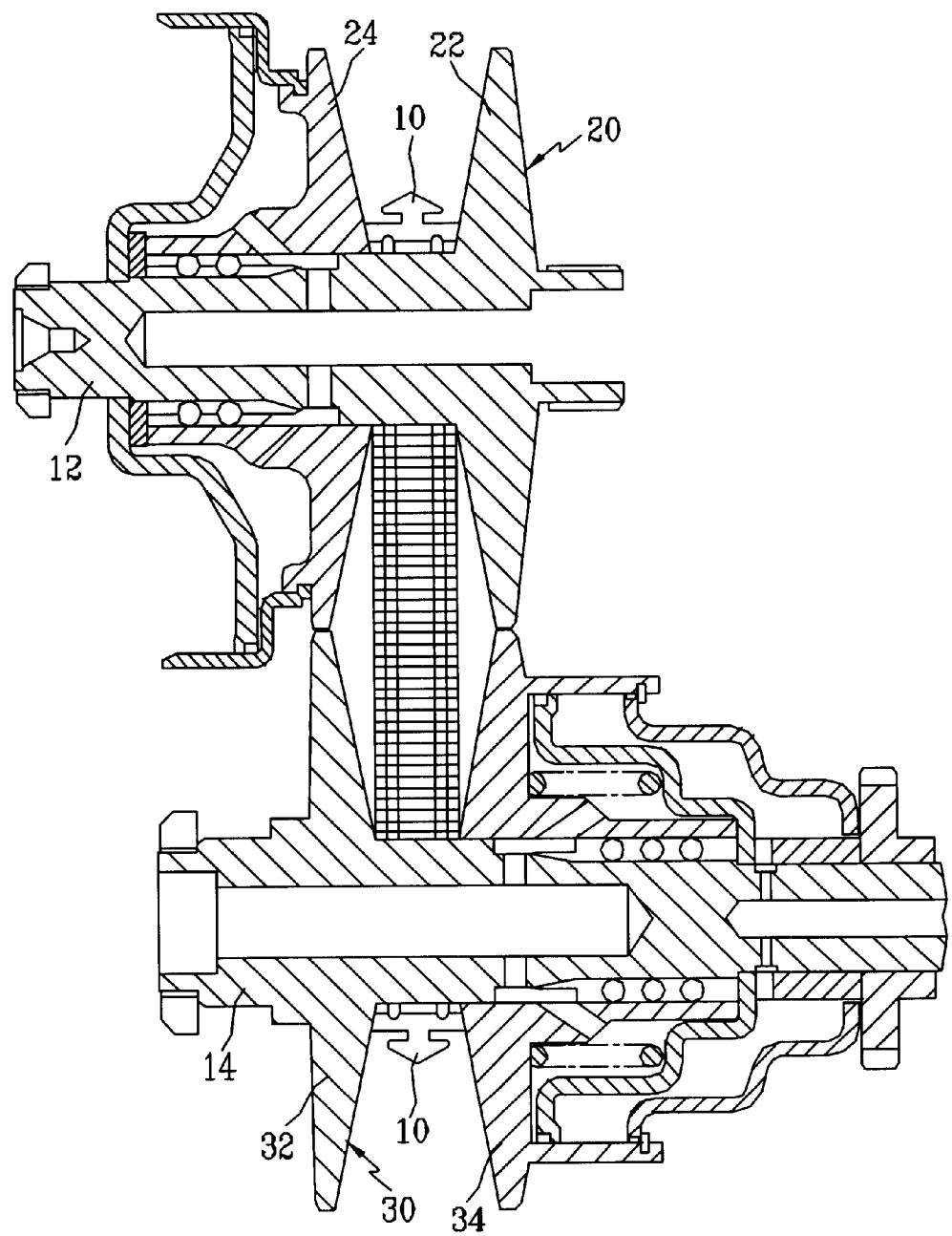
FIG. 1 is a sectional view of a pulley portion of a conventional gearless transmission.
Figure 2:
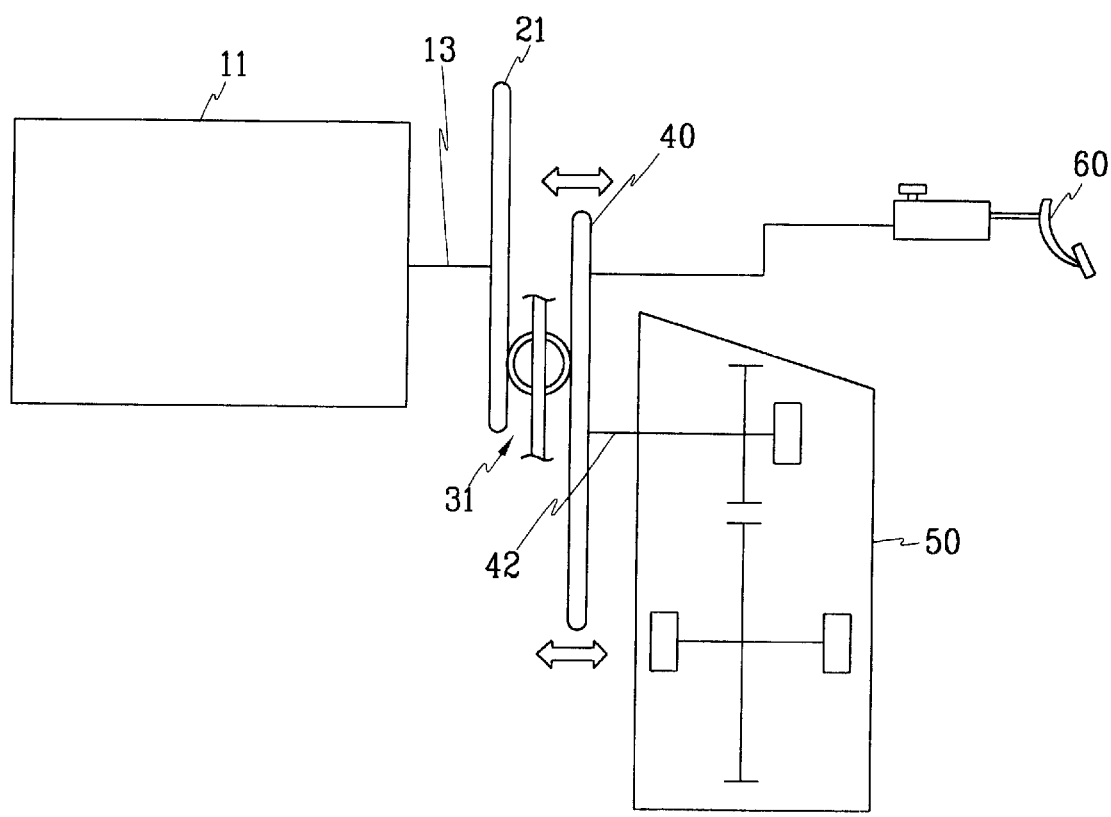
FIG. 2 is a schematic view of frictional variable transmission according to a preferred embodiment of the present invention.
Figure 3:
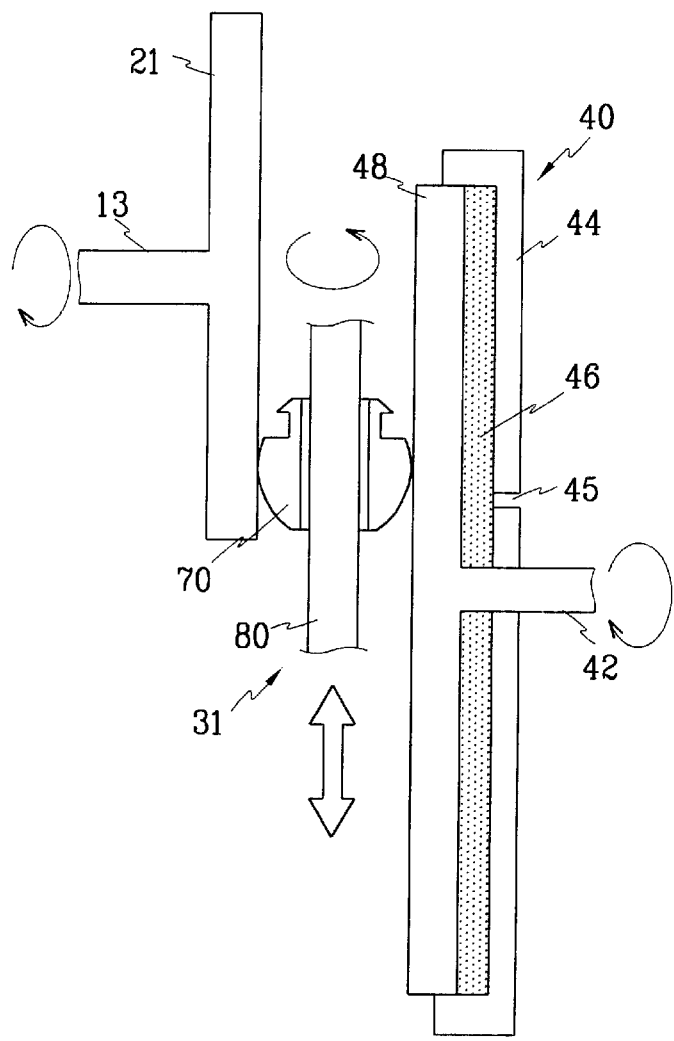
FIG. 3 is a detail view showing a connection of a power-varying unit of FIG. 2.

FIG. 2 shows a schematic view of frictional variable transmission according to a preferred embodiment of the present invention, and FIG. 3 is a detailed view showing a connection of a power-varying unit of FIG. 2.

As shown in the drawings, the frictional variable transmission includes a rotating unit 21, a power-varying unit 31, a hydraulic clutch 40, and a power transmitter 50. The rotating unit 21 is rotated by an engine 11. That is, a crankshaft 13, which rotates according to the operation of the engine 11, interconnects the rotating unit 21 and the engine 11. Also, a frictional face of the rotating unit 21 contacts the power-varying unit 31. This frictional face is evenly formed and acts as a frictional flywheel. The crankshaft 13 and the rotating unit 21 are integrally formed.

The power-varying unit 31, in a state of contacting the rotating unit 21, varies a rotational force transmitted from the rotating unit 21 by moving in a predetermined direction. The power-varying unit 31 includes a shift fork 90 for being indexed with a shift lever of a vehicle; a shift rod 80 positioned from a circumferential outer direction of the rotating unit 21 to a circumferential inner direction of the rotating unit 21 between the rotating unit 21 and the hydraulic clutch 40, both ends of the shift rod 80 being fixed; and a shift ball 70 mounted on the shift rod 80, and which, in a state of being connected to the shift fork, receives rotational force of the rotating unit 21 according to movement from the circumferential outer direction to the circumferential inner direction of the rotating unit 21, thereby rotating in a predetermined direction.

The hydraulic clutch 40 is mounted off-center from the rotating unit 20. That is, centers of the hydraulic clutch 40 and the rotating unit 21 are unaligned. The hydraulic clutch 40 varies between states of frictional contact with or separation from the power-varying unit 31 by hydraulic pressure generated according to a depressed state of a clutch pedal 60. Through this operation, the hydraulic clutch 40 controls the transmission of rotational force of the power-varying unit 31.

The hydraulic clutch 40 includes a clutch housing 44; a hydraulic pressure chamber 46 formed in the clutch housing 44 and which generates a predetermined hydraulic pressure according to a depressed state of the clutch pedal 60; and a friction plate 48 mounted off-center from the rotating unit 21 and integrally formed with a clutch shaft 42, the clutch shaft 42 moving in a direction of its longitudinal axis according to the generation of hydraulic pressure in the hydraulic pressure chamber 46 such that the friction plate 48 comes into contact with and is separated from the power-varying unit 31. A face of the friction plate 48 contacting the power-varying unit 31 is evenly formed. If the clutch pedal 60 is depressed, the hydraulic pressure formed in the hydraulic pressure chamber 46 is exhausted such that the friction plate 48 is separated from the power-varying unit 31. Reference numeral 45 in the drawing refers to a supply hole through which hydraulic pressure is supplied.

The power-transmitter 50 is linked to the movement of the hydraulic clutch 40, and transmits a rotational force corresponding to an input state of rotational force transmitted through the rotating unit 21 and the power-varying unit 31. The power-transmitter 50 is realized through a differential gear unit that includes a pinion and a differential.

Figure 4:
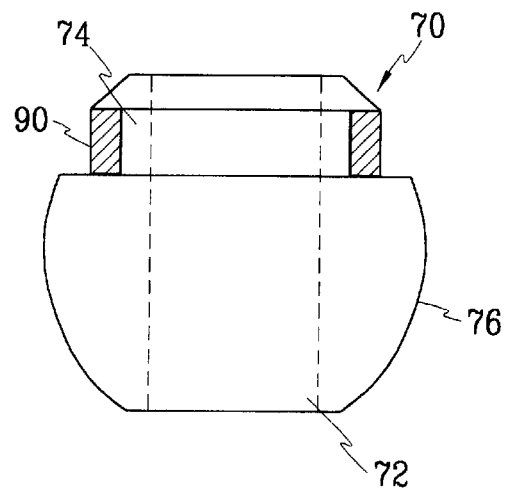
FIG. 4 is an enlarged view of a shift ball of FIG. 3.

FIG. 4 shows an enlarged view of the shift ball 70.

The shift ball 70 includes a hole 72 through which the shift rod 80 passes for mounting of the shift ball 70 on the shift rod 80, a fork-receiving portion 74 linked to the movement of the shift lever and to which the shift fork (90) is connected to enable movement in the axial direction of the shift rod 80, and a rolling frictional surface 76 formed roughly hemispherically under the fork-receiving portion 74.

As described above, the rotating unit 21 and the friction plate 48 are mounted eccentrically, and the shift ball 70 is provided between the rotating unit 21 and the friction plate 48 in a manner such that it is able to undergo movement in a direction as shown by the circular arrow of FIG. 3. Also, the shift ball 70 moves according to the operation of the shift lever such that gearless shifting into various forward and reverse speeds is realized.

The path that power is transmitted in the frictional variable transmission of the present invention is as follows: engine 11→rotating unit 21→shift ball 70→friction plate 48→clutch shaft 42→power transmitter 50.

Figure 5:
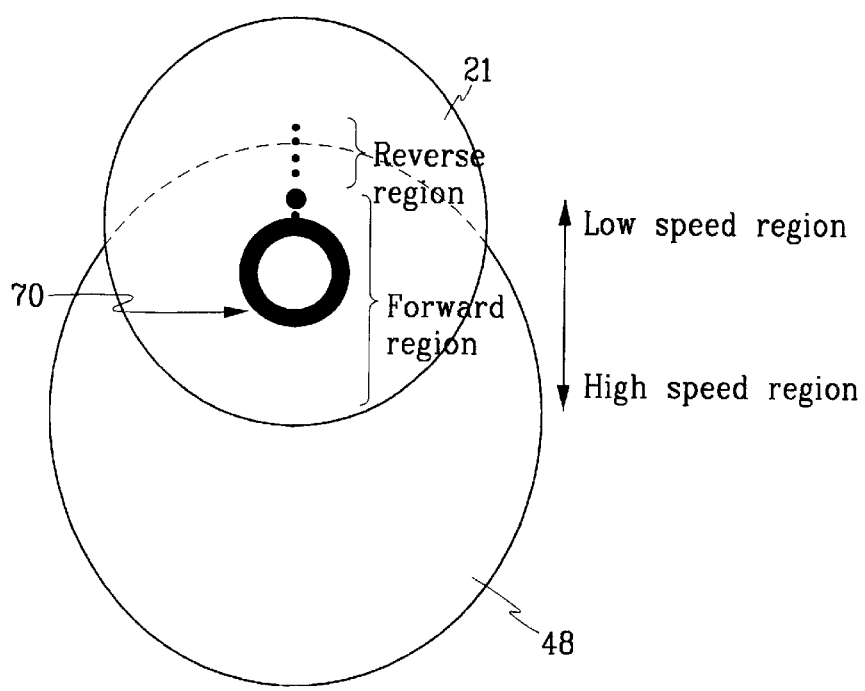
FIG. 5 is a drawing for describing a shift range of the frictional variable transmission of FIG. 2.
Figure 6A:
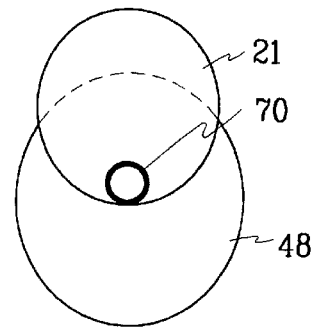
FIG. 6 shows relative positions of the power-varying unit of FIG. 3.
Figure 6B:
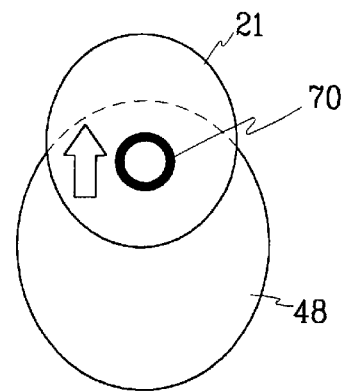
Figure 6C:
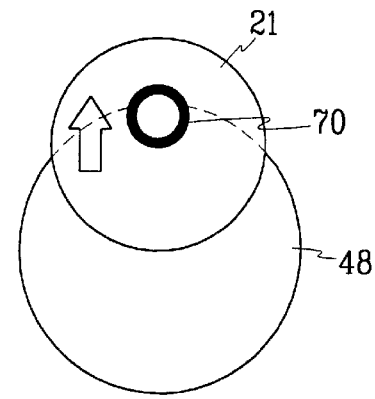

FIG. 5 shows a drawing for describing a shift range of the frictional variable transmission of FIG. 2; and FIG. 6 shows relative positions of the power-varying unit of FIG. 3. FIG. 6a shows a high-speed rotational state (of the shift ball 70), FIG. 6b shows a low speed rotational state, and FIG. 6c shows a reverse rotational state.

A shift range of the frictional variable transmission of the present invention will be described with reference to the drawings.

First, rotational force received from the engine 11 is directly transmitted to the rotating unit 21 and received by the shift ball 70. The rotational force of the shift ball 70 is then transmitted to the friction plate 48 of the hydraulic clutch 40. If the shift ball 70 is positioned at an outer circumference region of the rotating unit 21 as shown in FIG. 6a, the rotating unit 21 rotates the shift ball 70 at a high speed. As a result, the shift ball 70 rotates the friction plate 48 at a speed greater than the rotational speed of the rotating unit 21.

In the above state, if the shift ball 70 moves in the direction of the arrow in FIG. 6b, the rotating unit 21 rotates the shift ball 70 at a low speed. Accordingly, the shift ball 70 rotates the friction plate 48 at a speed slower than the rotational speed of the rotating unit 21.

Further, if the shift ball 70 continues to move in the direction of the arrows of FIGS. 6b and 6c until it is positioned as shown in FIG. 6c, the shift ball 70 passes a center point of the rotating unit 21 such that the rotating unit 21 rotates the shift ball 70 in the reverse direction. As a result, a rotational direction of the clutch shaft 42 comes to be opposite that of the rotating unit 21 such that the vehicle is driven in reverse.

The driver realizes shifting into the three shift ranges described above by manipulating the clutch and shift lever in the typical manner, that is by depressing the clutch pedal 60 and operating the shift lever. When the driver performs this operation, the friction plate 48 is distanced from the shift ball 70 then re-positioned, thereby realizing gearless shifting. In more detail, if the driver depresses the clutch pedal 60, the hydraulic pressure formed in the hydraulic chamber 46 is exhausted such that the force exerted by the friction plate 48 on the shift ball 70 is removed. Therefore, the shift ball 70, which is connected to the shift fork, may be easily moved.

The friction generated as a result of the shift ball 70 contacting both the rotating unit 21 and the friction plate 48 is not direct friction, but, rather, semi-solid friction. The following three regions are present in lubricated rolling contact.

First, in a hydrodynamic region, a stress level is low and there is a significant oil film thickness. In an elastohydrodynamic region, the thickness of the oil film is minimally influenced by loads. Finally, in a boundary lubrication region, there are problems of oil film damage and metal contact.

In the frictional variable transmission of the present invention, the friction generated by the contact of the shift ball 70 with the rotating unit 21 and the friction plate 48 undergoes rolling contact in the elastohydrodynamic region. Accordingly, an elastohydrodynamic fluid film is formed by the contact of the shift ball 70 with the rotating unit 21 and the friction plate 48.

The rotational force transmitted from the rotating unit 21 to the friction plate 48 by this rolling contact state is realized mainly by shearing of the oil film. Even if the contact between rolling members is point contact, a reflection of the contact surface is generally formed as an ellipse. Since there is not enough time for the exiting of the fluid trapped between the rotating unit 21, the shift ball 70, and the friction plate 48, a very high compression stress is easily generated (typical max Hertz stress: 100,000–500,000 Psi). This compression stress increases an instantaneous viscosity of the fluid, and determines a shear strength of the semi-solidified lubricant, which in turn determines a traction coefficient during contact.

In the frictional variable transmission of the present invention structured and operating as in the above, a relatively simple structure and an increased power transmission efficiency are realized. Accordingly, fuel consumption is decreased, a lighter overall weight is realized, and a reduction in manufacturing costs is obtained.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A frictional variable transmission for a vehicle comprising:
   a rotating unit rotated by an engine of the vehicle;
   a power-varying unit that varies, in a state of contacting the rotating unit, a rotational force transmitted from the rotating unit by moving in a predetermined direction;
   a hydraulic clutch mounted off-center from the rotating unit, and varying between states of frictional contact with or separation from the power-varying unit by hydraulic pressure generated according to a depressed state of a clutch pedal, thereby controlling transmission of rotational force of the power-varying unit; and
   a power transmitter linked to the movement of the hydraulic clutch so as to move responsive thereto, and transmitting a rotational force corresponding to an input state of rotational force transmitted through the rotating unit and the power-varying unit,
   wherein the power-varying unit comprises:
      a shift fork for being indexed with a shift lever of a vehicle;
      a shift rod positioned from a circumferential outer direction of the rotating unit to a circumferential inner direction of the rotating unit between the rotating unit and the hydraulic clutch;
      a shift ball mounted on the shift rod, and which, in a state of being connected to the shift fork, receives rotational force of the rotating unit according to movement from the circumferential outer direction to the circumferential inner direction of the rotation power unit, thereby rotating in a predetermined direction;
      a hole through which the shift rod passes for mounting of the shift ball on the shift rod;
      a fork-receiving portion to which the shift fork is connected such that the shift ball is enabled to move in the axial direction of the shift rod; and
      a rolling frictional surface formed roughly hemispherically under the fork-receiving portion.

2. The frictional variable transmission of claim 1 wherein the friction generated by the contact of the power-varying unit with the rotating unit and the hydraulic clutch undergoes rolling contact in an elastohydrodynamic region, and an elastohydrodynamic fluid film is formed.

3. The frictional variable transmission of claim 1 wherein if the power-varying unit is positioned at an outer circumference region of the rotating unit, the rotating unit rotates the power-varying unit at a high speed such that the power-varying unit rotates the hydraulic clutch faster than the rotating unit.

4. The frictional variable transmission of claim 1 wherein if the power-varying unit is positioned at an inner circumference region of the rotating unit, the rotating unit rotates the power-varying unit at a low speed such that the power-varying unit rotates the hydraulic clutch slower than the rotating unit.

5. The frictional variable transmission of claim 1 wherein if the power-varying unit is positioned on one side of an imaginary center line of the rotating unit, the rotating unit rotates the power-varying unit in a reverse direction such that the hydraulic clutch is rotated in a direction opposite that of the rotating unit.

6. The frictional variable transmission of claim 1 wherein a crankshaft, which rotates according to operation of the engine, interconnects the rotating unit and the engine, and a frictional face of the rotating unit that contacts the power-varying unit is evenly formed and acts as a frictional flywheel.

7. The frictional variable transmission of claim 6 wherein the crankshaft and the rotating unit are integrally formed.

8. The frictional variable transmission of claim 1 wherein the hydraulic clutch comprises:
   a clutch housing;
   a hydraulic pressure chamber formed in the clutch housing and which generates a predetermined hydraulic pressure according to a depressed state of the clutch pedal; and
   a friction plate mounted off-center from the rotating unit and connected to a clutch shaft, the clutch shaft moving in a direction of its longitudinal axis according to the generation of hydraulic pressure in the hydraulic pressure chamber such that the friction plate comes into contact with and is separated from the power-varying unit.

9. The frictional variable transmission of claim 8 wherein the clutch shaft and the friction plate are integrally formed.

10. The frictional variable transmission of claim 8 wherein if the clutch pedal is depressed, the hydraulic pressure formed in the hydraulic pressure chamber is exhausted such that the friction plate is separated from the power-varying unit.

* * * * *